(12) United States Patent
Krishnamoorthy et al.

(10) Patent No.: US 10,966,168 B1
(45) Date of Patent: Mar. 30, 2021

(54) PAGE COLLISION AVOIDANCE FOR 5G NR SINGLE RECEIVER MULTIPLE SUBSCRIBER IDENTITY MODULE DEVICES

(71) Applicant: QUALCOMM Incorporated, San Diego, CA (US)

(72) Inventors: Parthasarathy Krishnamoorthy, San Diego, CA (US); Tao Luo, San Diego, CA (US); Raghu Narayan Challa, San Diego, CA (US); Chetan Chakravarthy, San Diego, CA (US); Krishna Rao Mandadapu, San Diego, CA (US); Vijay Marwah, Rancho Santa Fe, CA (US); Mueez Ahmad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/694,787

(22) Filed: Nov. 25, 2019

(51) Int. Cl.
| | |
|---|---|
| *H04W 74/00* | (2009.01) |
| *H04W 74/08* | (2009.01) |
| *H04W 56/00* | (2009.01) |
| *H04W 24/08* | (2009.01) |
| *H04B 17/318* | (2015.01) |
| *H04W 68/00* | (2009.01) |
| *H04W 4/60* | (2018.01) |

(52) U.S. Cl.
CPC ........ *H04W 56/001* (2013.01); *H04B 17/318* (2015.01); *H04W 4/60* (2018.02); *H04W 24/08* (2013.01); *H04W 68/005* (2013.01)

(58) Field of Classification Search
CPC .. H04W 76/15; H04W 56/001; H04W 12/003
See application file for complete search history.

(56) References Cited

U.S. PATENT DOCUMENTS

| | | | |
|---|---|---|---|
| 2018/0324746 A1* | 11/2018 | Balasubramanian | ........................ H04W 68/005 |
| 2019/0124636 A1* | 4/2019 | Jiang | ..................... H04W 68/02 |
| 2019/0239283 A1* | 8/2019 | Kwak | ............... H04W 74/0833 |
| 2020/0374921 A1* | 11/2020 | Li | ........................... H04W 8/26 |

* cited by examiner

*Primary Examiner* — Gary Lafontant
(74) *Attorney, Agent, or Firm* — Kevin M. Donnelly

(57) ABSTRACT

Various aspects of the present disclosure generally relate to wireless communication. In some aspects, a user equipment (UE) may determine a first set of synchronization signal blocks (SSBs) for a first subscription of the UE and a second set of SSBs for a second subscription of the UE; select a first SSB, from the first set of SSBs, for communications of the first subscription; identify a third set of SSBs by modifying the second set of SSBs to remove one or more SSBs from the second set of SSBs, at least one SSB of the one or more SSBs overlapping in time with the first SSB; select a second SSB from the third set of SSBs; and monitor the second SSB for paging messages of the second subscription. Numerous other aspects are provided.

30 Claims, 7 Drawing Sheets

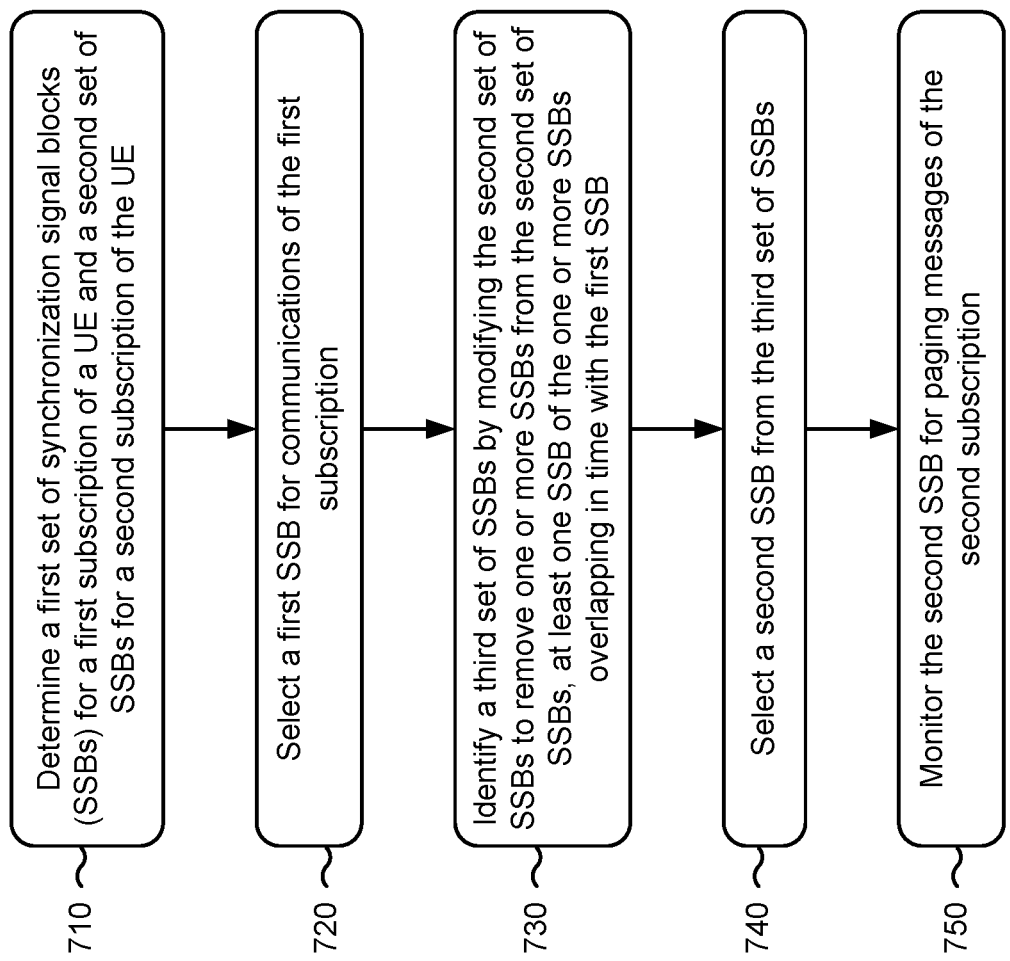

PAGE COLLISION AVOIDANCE FOR 5G NR SINGLE RECEIVER MULTIPLE SUBSCRIBER IDENTITY MODULE DEVICES

FIELD OF THE DISCLOSURE

Aspects of the present disclosure generally relate to wireless communication and specifically, to techniques and apparatuses for page collision avoidance for a single receiver multiple subscriber identity module device.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A single receiver dual subscriber identity module dual standby (SR-DSDS) UE or a single receiver multiple subscriber identity module multiple standby UE may be associated with multiple subscriptions but may include only a single transceiver shared by the multiple subscriptions. As a result, the UE may be unable to receive simultaneous paging messages for multiple subscriptions, and may be more likely to miss paging messages when those paging messages occur simultaneously for different subscriptions.

SUMMARY

In some aspects, a method of wireless communication, performed by a user equipment (UE), may include determining a first set of synchronization signal blocks (SSBs) for a first subscription of the UE and a second set of SSBs for a second subscription of the UE; selecting a first SSB, from the first set of SSBs, for communications of the first subscription; identifying a third set of SSBs by modifying the second set of SSBs to remove one or more SSBs from the second set of SSBs, at least one SSB of the one or more SSBs overlapping in time with the first SSB; selecting a second SSB from the third set of SSBs; and monitoring the second SSB for paging messages of the second subscription.

In some aspects, a UE for wireless communication may include memory and one or more processors operatively coupled to the memory. The memory and the one or more processors may be configured to determine a first set of SSBs for a first subscription of the UE and a second set of SSBs for a second subscription of the UE; select a first SSB, from the first set of SSBs, for communications of the first subscription; identify a third set of SSBs by modifying the second set of SSBs to remove one or more SSBs from the second set of SSBs, at least one SSB of the one or more SSBs overlapping in time with the first SSB; select a second SSB from the third set of SSBs; and monitor the second SSB for paging messages of the second subscription.

In some aspects, a non-transitory computer-readable medium may store one or more instructions for wireless communication. The one or more instructions, when executed by one or more processors of a UE, may cause the one or more processors to: determine a first set of SSBs for a first subscription of the UE and a second set of SSBs for a second subscription of the UE; select a first SSB, from the first set of SSBs, for communications of the first subscription; identify a third set of SSBs by modifying the second set of SSBs to remove one or more SSBs from the second set of SSBs, at least one SSB of the one or more SSBs overlapping in time with the first SSB; select a second SSB from the third set of SSBs; and monitor the second SSB for paging messages of the second subscription.

In some aspects, an apparatus for wireless communication may include means for determining a first set of SSBs for a first subscription of the apparatus and a second set of SSBs for a second subscription of the apparatus; means for selecting a first SSB, from the first set of SSBs, for communications of the first subscription; means for identifying a third set of SSBs by modifying the second set of SSBs to remove one or more SSBs from the second set of SSBs, at least one SSB of the one or more SSBs overlapping in time with the first SSB; means for selecting a second SSB from the third set of SSBs; and means for monitoring the second SSB for paging messages of the second subscription.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 7 is a flowchart illustrating an example process performed by a UE in accordance with various aspects of the present disclosure.

DETAILED DESCRIPTION

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

A single receiver dual subscriber identity module dual standby (SR-DSDS) user equipment (UE) or a single receiver multiple subscriber identity module multiple standby UE may be associated with multiple subscriptions but may include only a single transceiver shared by the multiple subscriptions. As a result, the UE may be unable to receive simultaneous paging messages for multiple subscriptions, and may be more likely to miss paging messages when those paging messages occur simultaneously for different subscriptions. Some techniques and apparatuses described herein enable an SR-DSDS UE or a single receiver multiple subscriber identity module multiple standby UE to avoid or reduce the likelihood of paging collision across different subscriptions. Furthermore, these techniques and apparatuses may enable the SR-DSDS UE or the single receiver multiple subscriber identity module multiple standby UE to receive pages on different subscriptions in the same paging occasion. As a result, latency may be reduced, signaling overhead may be reduced, and fewer communications may be dropped.

Figure 1:
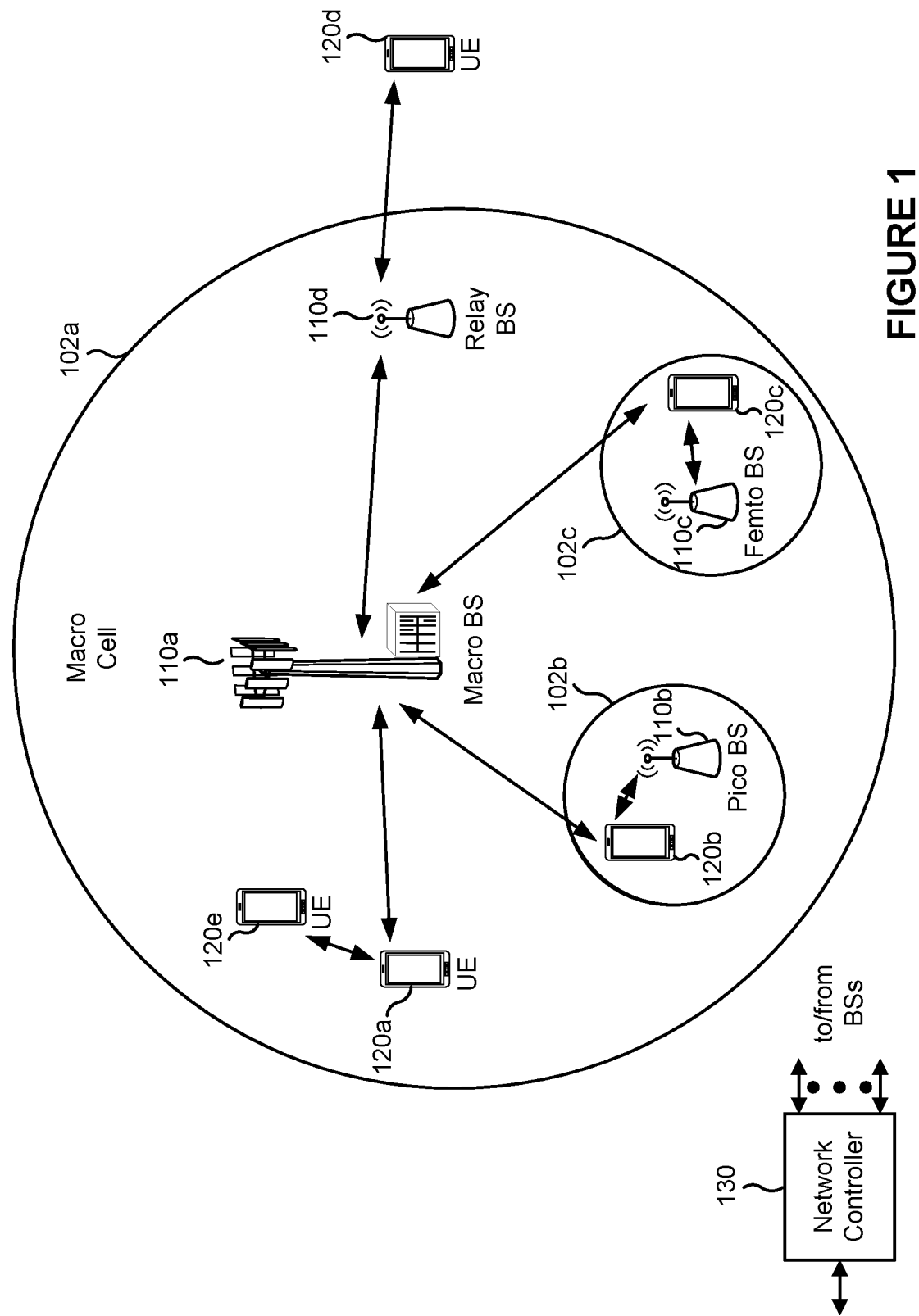
FIG. 1 is a block diagram illustrating an example wireless network in accordance with various aspects of the present disclosure.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with UEs and may also be referred to as a Node B, an eNodeB, an eNB, a gNB, a NR BS, a 5G node B (NB), an access point (AP), or a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In this case, the UE 120 may perform scheduling operations, resource selection operations, or other operations described elsewhere herein as being performed by the base station 110.

Figure 2:
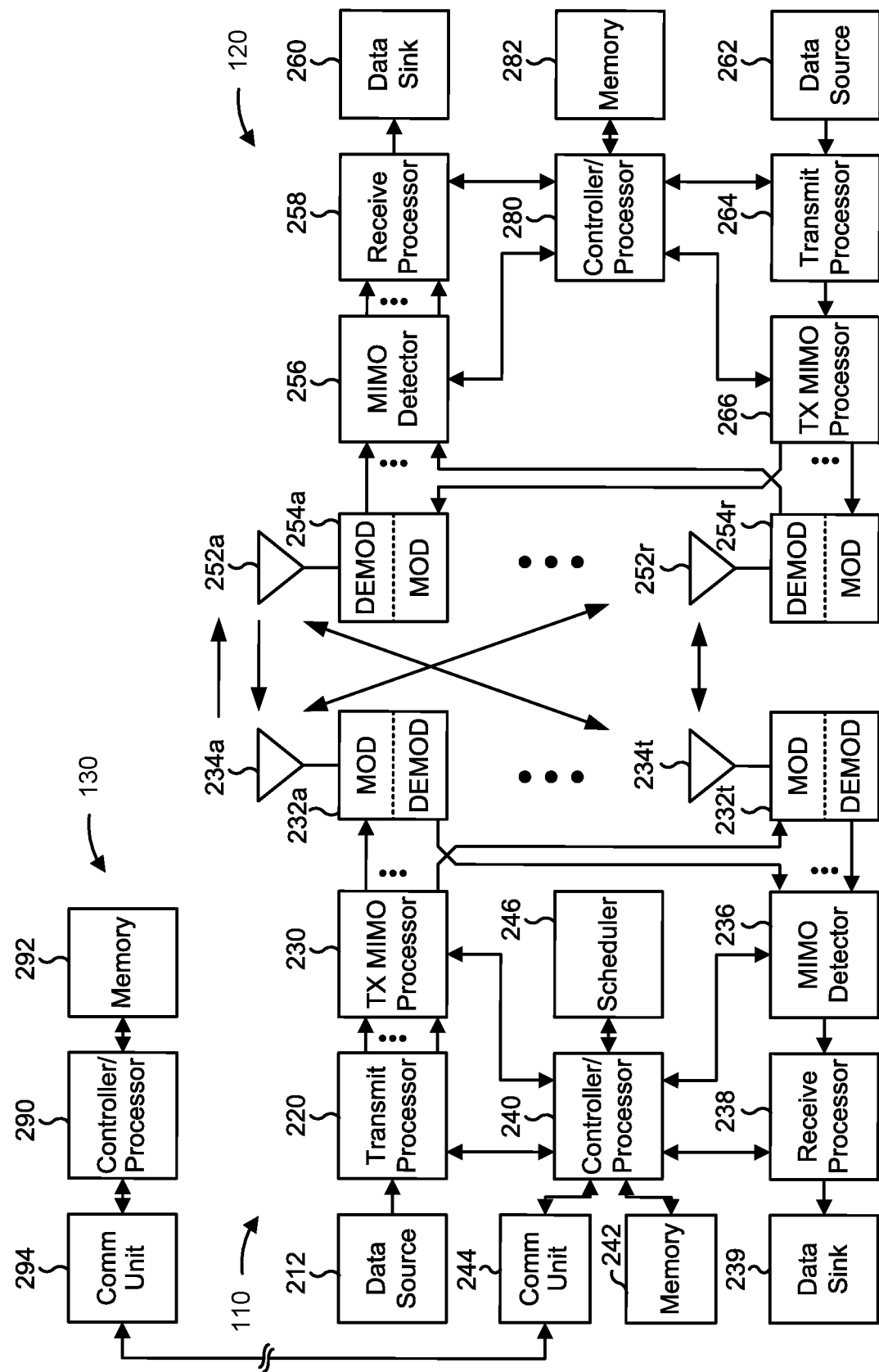
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with page collision avoidance for a single receiver multiple subscriber identity module (SIM) UE, as described in more detail elsewhere herein. For example, controller/processor 240 of base station 110, controller/processor 280 of UE 120, or any other component(s) of FIG. 2 may perform or direct operations of, for example, the process of FIG. 7 or other processes as described herein. Memories 242 and 282 may store data and program codes for base station 110 and UE 120, respectively. A scheduler 246 may schedule UEs for data transmission on the downlink or uplink.

In some aspects, UE 120 may include means for determining a first set of synchronization signal blocks (SSBs) for a first subscription of the UE 120 and a second set of SSBs for a second subscription of the UE 120; means for selecting a first SSB, from the first set of SSBs, for communications of the first subscription; means for identifying a third set of SSBs by modifying the second set of SSBs to remove one or more SSBs from the second set of SSBs, at least one SSB of the one or more SSBs overlapping in time with the first SSB; means for selecting a second SSB from the third set of SSBs; means for monitoring the second SSB for paging messages of the second subscription; among other examples, or combinations thereof. In some aspects, such means may include one or more components of UE 120 described in connection with FIG. 2.

Figure 3:
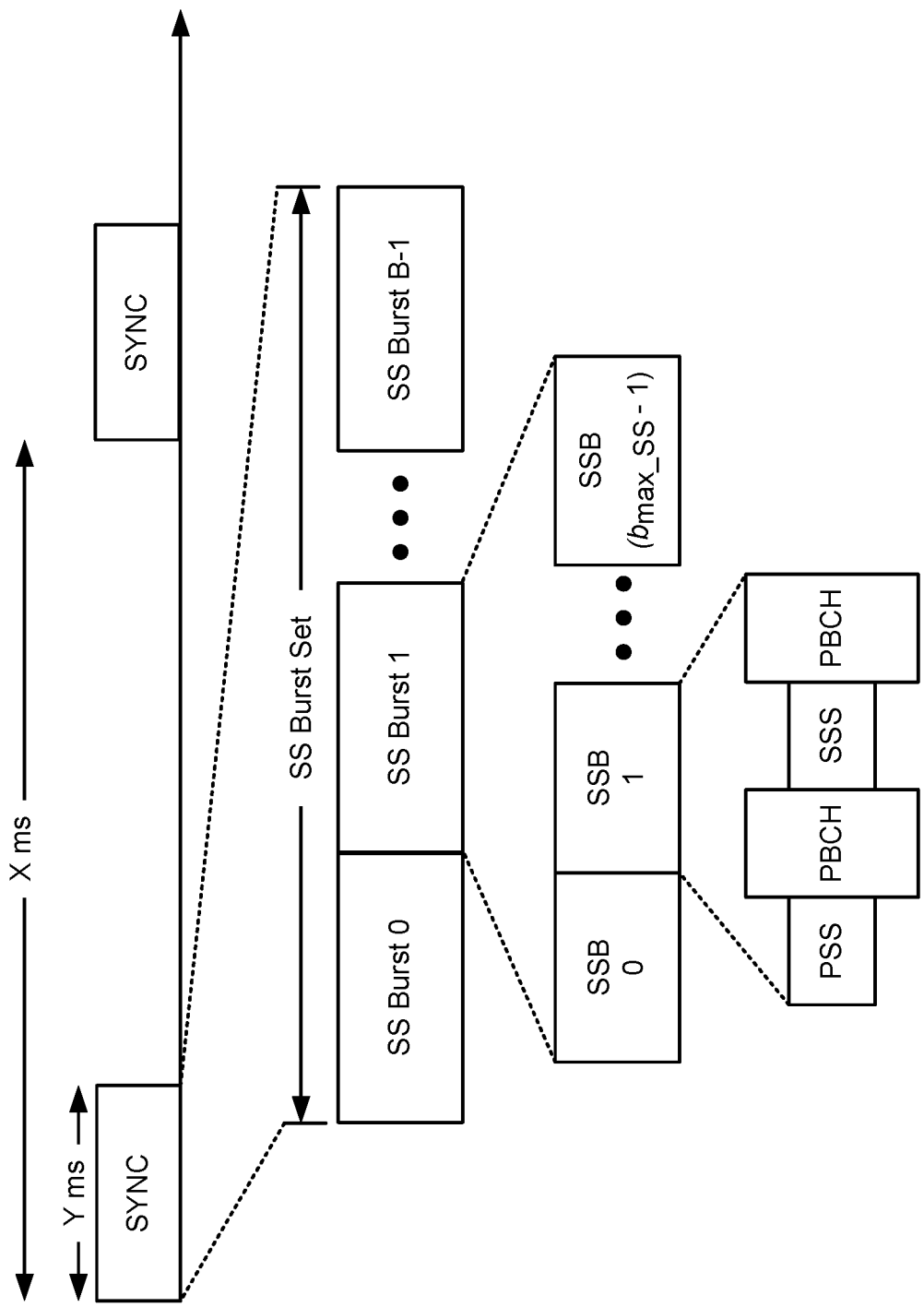
FIG. 3 is a block diagram illustrating an example synchronization signal hierarchy for use in a wireless communication network in accordance with various aspects of the present disclosure.

FIG. 3 is a block diagram illustrating an example synchronization signal (SS) hierarchy for use in a wireless communication network in accordance with various aspects of the present disclosure. As shown in FIG. 3, the SS hierarchy may include an SS burst set, which may include a plurality of SS bursts (identified as SS burst 0 through SS burst B−1, where B is a maximum quantity of repetitions of the SS burst that may be transmitted by the base station). As further shown, each SS burst may include one or more SS blocks (SSBs) (identified as SSB 0 through SSB ($b_{max\_SS}$−1), where $b_{max\_SS}$ is a maximum quantity of SSBs that can be carried by an SS burst, such as 8 SSBs or 64 SSBs, among other examples). In some aspects, different SSBs may be beam-formed differently or may correspond to different beams. An SS burst set may be periodically transmitted by a wireless node, such as every X milliseconds, as shown in FIG. 3. In some aspects, an SS burst set may have a fixed or dynamic length, shown as Y milliseconds in FIG. 3.

An SSB may include resources that carry the PSS, the SSS, the PBCH, or other synchronization signals (for example, a tertiary synchronization signal (TSS)) or synchronization channels. In some aspects, multiple SSBs are included in an SS burst, and the PSS, the SSS, or the PBCH may be the same across each SSB of the SS burst. In some aspects, a single SSB may be included in an SS burst. In some aspects, an SSB may be at least four symbol periods in length, where each symbol carries one or more of the PSS (for example, occupying one symbol), the SSS (for example, occupying one symbol), or the PBCH (for example, occupying two symbols).

In some aspects, the symbols of an SSB are consecutive, as shown in FIG. 3. In some aspects, the symbols of an SSB are non-consecutive. Similarly, in some aspects, one or more SSBs of the SS burst may be transmitted in consecutive radio resources (for example, consecutive symbol periods) during one or more slots. Additionally or alternatively, one or more SSBs of the SS burst may be transmitted in non-consecutive radio resources.

In some aspects, the SS bursts may have a burst period during which the SSBs of the SS burst are transmitted by the base station in accordance with the burst period. In other words, the SSBs may be repeated during each SS burst. In some aspects, the SS burst set may have a burst set periodicity, and the SS bursts of the SS burst set are transmitted by the base station in accordance with the fixed burst set periodicity. In other words, the SS bursts may be repeated during each SS burst set.

Figure 4:
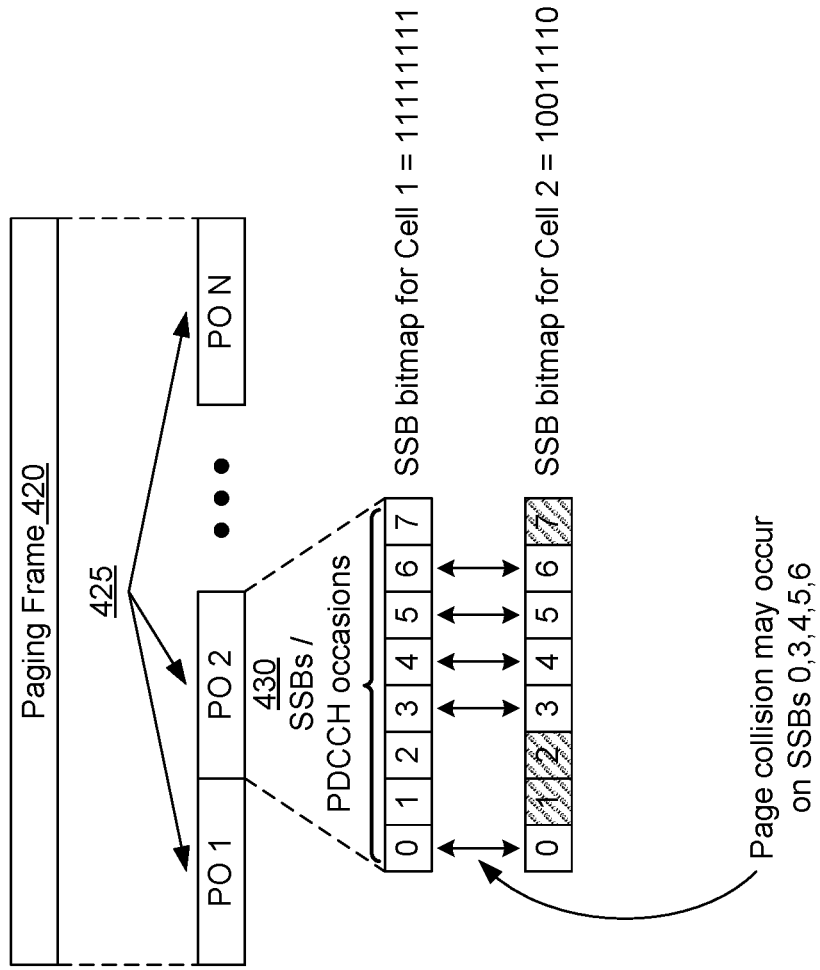
FIG. 4 is a diagram illustrating an example of a page collision for a single receiver multiple subscriber identity module (SIM) UE in accordance with various aspects of the present disclosure.
Figure 4:
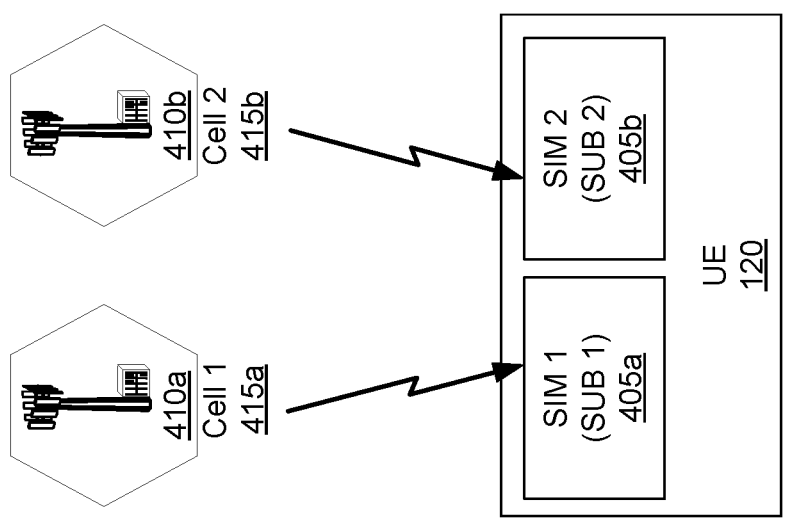

FIG. 4 is a diagram illustrating an example of a page collision for a single receiver multiple SIM multiple standby UE in accordance with various aspects of the present disclosure. As shown in FIG. 4, a UE 120 may be a multiple SIM (multi-SIM) UE that includes multiple SIMs (two or more SIMs), shown as a first SIM 405a and a second SIM 405b. The first SIM 405a may be associated with a first subscription (shown as SUB 1), and the second SIM 405b may be associated with a second subscription (shown as SUB 2). A subscription may refer to a subscription with a network operator (for example, a mobile network operator (MNO)) that enables the UE 120 to access a wireless network (for example, a radio access network (RAN)) associated with the network operator. A SIM 405 may be a removable SIM (for example, a SIM card) or an embedded SIM. A SIM 405 may include an integrated circuit that securely stores an international mobile subscriber identity (IMSI) and a security key, which are used to identify and authenticate a corresponding subscription associated with the SIM 405. In some cases, a SIM 405 may store a list of services that the UE 120 has permission to access using a subscription associated with the SIM 405, such as a data service or a voice service, among other examples.

As further shown in FIG. 4, the UE 120 may communicate (for example, in a connected mode, an idle mode, or an inactive mode) with a first base station 410*a* via a first cell 415*a* (shown as Cell 1) using the first SIM 405*a*. In this case, a first subscription (SUB 1) of the UE 120 may be used to access the first cell 415*a* (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode or an idle mode) with a second base station 410*b* via a second cell 415*b* (shown as Cell 2) using the second SIM 405*b*. In this case, a second subscription (SUB 2) of the UE 120 may be used to access the second cell 415*b* (for example, using a second IMSI for UE identification, using a second security key for UE authentication, using a second list of services that the UE 120 is permitted to access using the second subscription, or by counting data or voice usage on the second cell against the second subscription, among other examples). The first base station 410*a* or the second base station 410*b* may include one or more of the base stations 110 described above in connection with FIG. 1.

In some cases, the UE 120 may be a single receiver (SR) (sometimes also referred to as single radio) multi-SIM UE, such as an SR multi-SIM multiple standby (SR-MSMS) UE or a single receiver dual SIM dual standby (SR-DSDS) UE, among other examples. A multi-SIM UE may be capable of switching between two separate mobile network services, may include hardware for keeping multiple connections (for example, one connection per SIM) in a standby state, or may include hardware (for example, multiple transceivers) for maintaining multiple network connections at the same time, among other examples. However, an SR-DSDS UE or an SR-MSMS UE may only be capable of receiving data on one connection at a time because radio frequency resources are shared between the multiple subscriptions. For example, an SR-DSDS UE or an SR-MSMS UE may be associated with multiple subscriptions but include only a single transceiver shared by the multiple subscriptions, a single transmit chain shared by the multiple subscriptions, or a single receive chain shared by the multiple subscriptions, among other examples. As a result, the UE 120 may be unable to receive simultaneous paging messages for multiple subscriptions, and may be more likely to miss paging messages when those paging messages occur simultaneously for different subscriptions.

For example, the UE 120 may be configured with or may use a specified paging frame 420 to monitor for paging messages. A paging frame 420 may include multiple paging occasions (POs) 425, shown as PO 1, PO 2, . . . , PO N. Each paging occasion 425 may include multiple physical downlink control channel (PDCCH) occasions 430 (sometimes referred to as a PDCCH monitoring occasion). Each PDCCH occasion 430 may correspond to a specific SSB. A PDCCH occasion 430 or SSB within a paging occasion 425 may be used to carry a paging message (sometimes referred to as a page). A base station 110 may transmit a paging message for a UE 120 in multiple PDCCH occasions 430 (for example, all of the SSBs that are actually transmitted by the base station 110) because the base station 110 does not have information indicating which SSB should be used to communicate with a UE 120 when the UE 120 is monitoring for paging messages (for example, in an idle mode or an inactive mode). The UE 120 may measure multiple SSBs to identify an optimal SSB to be used to communicate with the base station 110, and may monitor the PDCCH occasion 430 corresponding to that SSB for paging messages.

In some cases, a base station 110 may indicate (for example, in a radio resource control (RRC) message), an SSB bitmap to be used by the UE 120 to monitor SSBs. For example, the base station 110 may be permitted to transmit a maximum quantity or number of SSBs (for example, in a paging occasion or an SS burst), such as 8 SSBs for frequency range (FR) 1 or 64 SSBs for FR2, among other examples. However, the base station 110 may actually transmit fewer SSBs than the maximum quantity or number, and thus may indicate (for example, using an SSB bitmap) the indices of the SSBs actually transmitted by the base station 110. As shown in FIG. 4, the first base station 410*a* indicates a bitmap of 11111111 for Cell 1 (and SUB 1), indicating that the first base station 410*a* actually transmits all 8 SSBs (for example, for FR1). As further shown, the second base station 410*b* indicates a bitmap of 10011110 for Cell 2 (and SUB 2), indicating that the second base station 410*b* actually transmits SSBs having indices of 0, 3, 4, 5, and 6, and does not transmit SSBs having indices of 1, 2, and 7.

In this case, page collision may occur on PDCCH occasions corresponding to SSBs 0, 3, 4, 5, or 6 because base station 410*a* and base station 410*b* both transmit those SSBs. Because the UE 120 is an SR-DSDS UE or an SR-MSMS UE and is only capable of receiving communications on a single subscription at a time, the UE 120 is incapable of receiving a page on both subscriptions at the same time. Thus, if a page collision occurs, the UE 120 may miss a page. In some cases, the UE 120 may employ an algorithm to switch between different subscriptions when monitoring for paging messages, such as by monitoring for a paging message on a first subscription in a first paging occasion and monitoring for a paging message on a second subscription in a subsequent paging occasion, and alternating between subscriptions on different paging occasions. However, the UE 120 may still miss paging messages when employing this algorithm (for example, the UE 120 may miss a paging message on the second subscription in the first paging occasion and may miss a paging message on the first subscription in the subsequent paging occasion). This may lead to increased latency due to missed paging messages, may consume network resources and increase signaling overhead due to repetition of paging messages, or may lead to dropped communications if a base station 110 does not repeat paging messages or if multiple paging messages are missed by the UE 120.

Some techniques and apparatuses described herein enable an SR-DSDS UE or an SR-MSMS UE to avoid or reduce the likelihood of paging collision across different subscriptions. Furthermore, these techniques and apparatuses may enable the SR-DSDS UE or the SR-MSMS UE to receive pages on different subscriptions in the same paging occasion. As a result, latency may be reduced, signaling overhead may be reduced, and fewer communications may be dropped.

Figure 5:
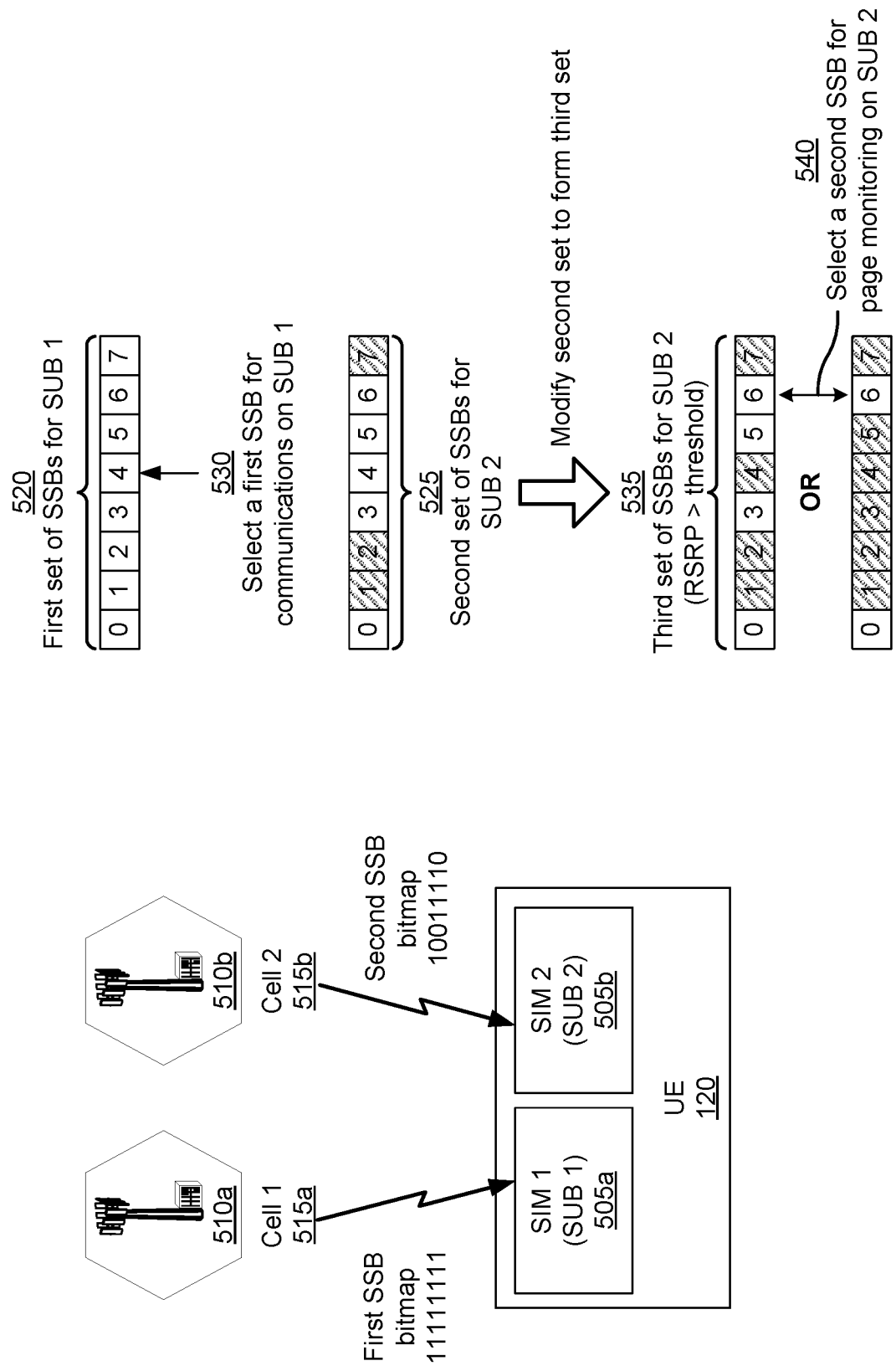
FIG. 5 is a diagram illustrating an example of page collision avoidance for a single receiver multiple SIM UE in accordance with various aspects of the present disclosure.

FIG. 5 is a diagram illustrating an example of page collision avoidance for a single receiver multiple SIM UE in accordance with various aspects of the present disclosure. As shown in FIG. 5, a UE 120 may be a multi-SIM UE, such as an SR-DSDS UE (or a UE operating in an SR-DSDS mode) or an SR-MSMS UE (or a UE operating in an SR-MSMS mode), as described above in connection with FIG. 4. The UE 120 may include multiple SIMs, shown as a first SIM 505a and a second SIM 505b. The first SIM 505a may be associated with a first subscription (shown as SUB 1), and the second SIM 505b may be associated with a second subscription (shown as SUB 2), as described above in connection with FIG. 4. In some aspects, the first subscription may be associated with a higher priority service, and the second subscription may be associated with a lower priority service. For example, the first subscription may be associated with a voice service (for example, a voice-only service or a voice and data service), and the second subscription may be associated with a data-only service. Additionally or alternatively, the first subscription may be associated with a more stringent quality of service (QoS) requirement, and the second subscription may be associated with a less stringent QoS requirement.

The UE 120 may communicate (for example, in a connected mode, an idle mode, or an inactive mode) with a first base station 510a via a first cell 515a (shown as Cell 1) using the first SIM 505a, and may communicate with a second base station 510b via a second cell 515b (shown as Cell 2) using the second SIM 505b. In this case, a first subscription (SUB 1) of the UE 120 may be used to access the first cell 515a, and a second subscription (SUB 2) of the UE 120 may be used to access the second cell 515b, as described above in connection with FIG. 4. The first base station 510a or the second base station 510b may include one or more of the base stations 110 described above in connection with FIG. 1.

As shown in FIG. 5, the first base station 510a may indicate (for example, in an RRC message or system information, among other examples) a first SSB bitmap to be used by the UE 120 to monitor SSBs for the first subscription. In the example of FIG. 5, the first base station 510a indicates a bitmap of 11111111 for Cell 1 (and SUB 1), indicating that the first base station 410a actually transmits all 8 SSBs (for example, for FR1). Similarly, the second base station 510b may indicate a second SSB bitmap to be used by the UE 120 to monitor SSBs for the second subscription. In the example of FIG. 5, the second base station 510b indicates a bitmap of 10011110 for Cell 2 (and SUB 2), indicating that the second base station 510b actually transmits SSBs having indices of 0, 3, 4, 5, and 6, and does not transmit SSBs having indices of 1, 2, and 7.

The UE 120 may determine a first set of SSBs 520 for the first subscription based at least in part on the first SSB bitmap, and may determine a second set of SSBs 525 for the second subscription based at least in part on the second SSB bitmap. For example, the first SSB bitmap may indicate the first set of SSBs 520 to be measured or monitored by the UE 120 for the first subscription (for example, SSBs 0 through 7). Similarly, the second SSB bitmap may indicate the second set of SSBs 525 to be measured or monitored by the UE 120 for the second subscription (for example, SSBs 0, 3, 4, 5, and 6).

As further shown in FIG. 5, the UE 120 may select a first SSB 530 from the first set of SSBs 520. The first SSB 530 may be used by the UE 120 for communications associated with the first subscription, such as for paging messages of the first subscription, control communications of the first subscription, or data communications of the first subscription, among other examples. In some aspects, the UE 120 may select the first SSB 530 by measuring all or a subset of the first set of SSBs 520 and selecting the best SSB from the measured SSBs of the first set of SSBs 520 (for example, the SSB with the best measurement(s) or best signal parameter, such as the best reference signal received power (RSRP) parameter, among other examples). The UE 120 may use the first SSB 530 to monitor for paging messages on the first subscription, such as by monitoring a PDCCH occasion that corresponds to the first SSB 530.

As further shown in FIG. 5, the UE 120 may modify the second set of SSBs 525 to form or identify a third set of SSBs 535. For example, the UE 120 may remove one or more SSBs from the second set of SSBs 525 to form the third set of SSBs 535. The one or more SSBs removed from the second set of SSBs 525 may include an SSB (sometimes referred to as an overlapping SSB) that overlaps in time with the first SSB 530 (for example, that has a same SSB index as the first SSB 530). As a result, the UE 120 may eliminate the overlapping SSB as a candidate for selection for the second subscription, thereby reducing the likelihood of a missed page. In some aspects, the one or more SSBs removed from the second set of SSBs 525 may include the overlapping SSB and one or more additional SSBs that are adjacent in time to the overlapping SSB, that occur within a threshold amount of time of the overlapping SSB (for example, a time required to switch between subscriptions), that have an SSB index that is adjacent to an SSB index of the overlapping SSB, or that have an SSB index that is within a threshold offset of an SSB index of the overlapping SSB, among other examples. As a result, the UE 120 may eliminate one or more SSBs, that would impede the ability of the UE 120 to switch between subscriptions to obtain multiple pages, as a candidate for selection for the second subscription, thereby reducing the likelihood of a missed page.

In the example of FIG. 5, the UE 120 selects SSB 4 on the first subscription. In a first example, the UE 120 is shown as removing SSB 4 from the second set of SSBs 525 to form the third set of SSBs 535. In this case, the second set of SSBs 525 includes SSBs 0, 3, 4, 5, and 6, and the third set of SSBs 535 includes SSBs 0, 3, 5, and 6. In a second example, the UE 120 is shown as removing SSB 4 and adjacent SSBs 3 and 5 from the second set of SSBs 525 to form the third set of SSBs 535. In this case, the second set of SSBs 525 includes SSBs 0, 3, 4, 5, and 6, and the third set of SSBs 535 includes SSBs 0 and 6.

After forming the third set of SSBs 535, the UE 120 may select a second SSB 540 from the third set of SSBs 535. The second SSB 540 may be used by the UE 120 for paging messages associated with the second subscription. In some aspects, the UE 120 may select the second SSB 540 by measuring all or a subset of the third set of SSBs 535 and selecting the best SSB from the measured SSBs of the third set of SSBs 535 (for example, the SSB with the best measurement(s) or best signal parameter). The UE 120 may use the second SSB 540 to monitor for paging messages on the second subscription, such as by monitoring a PDCCH occasion that corresponds to the second SSB 540. In the example of FIG. 5, the UE 120 selects SSB 6 for the second subscription.

Thus, the UE 120 may monitor SSB 4 (or a PDCCH occasion corresponding to SSB 4) for paging messages on the first subscription, and may monitor SSB 6 (or a PDCCH occasion corresponding to SSB 6) for paging messages on the second subscription. As a result, the UE 120 may be capable of receiving pages on both the first subscription and the second subscription within the same paging occasion, thereby reducing latency in obtaining a page and corresponding data, reducing signaling overhead and conserving network resources that would otherwise be used for page repetitions if the UE 120 missed a page, and improving network performance via fewer dropped communications.

In some aspects, after identifying the third set of SSBs 535, the UE 120 may determine whether any SSBs, included in the third set of SSBs 535, are associated with a signal strength parameter that satisfies a threshold. The signal strength parameter may include, for example, an RSRP parameter, a reference signal received quality (RSRQ) parameter, a received signal strength indicator (RSSI) parameter, or a signal to interference plus noise ratio (SINR) parameter, among other examples. The threshold may be stored in memory of the UE 120. Additionally or alternatively, the threshold may be indicated to the UE 120 by a base station 110. If at least one SSB in the third set of SSBs 535 is associated with a signal strength parameter that satisfies the threshold, then the UE 120 may select the second SSB 540 from the third set of SSBs 535. Otherwise, if no SSBs in the third set of SSBs 535 are associated with a signal strength parameter that satisfies the threshold, then the UE 120 may select the second SSB 540, used to monitor for paging messages on the second subscription, from the second set of SSBs 525. In this way, the UE 120 may reduce the likelihood of continuously missing pages (for example, due to selection of an SSB with a low signal strength). In this case, the UE 120 may alternate between subscriptions for different paging occasions, as described elsewhere herein.

In some aspects, the UE 120 may determine whether to form the third set of SSBs 535 based at least in part on whether a quantity of SSBs, included in the second set of SSBs 525, satisfies a threshold (such as 2, 3, or 4, among other examples). The threshold may be stored in memory of the UE 120. Additionally or alternatively, the threshold may be indicated to the UE 120 by a base station 110. In this case, the UE 120 may form or identify the third set of SSBs 535 based at least in part on a determination that a quantity of SSBs, included in the second set of SSBs, satisfies the threshold, and may select the second SSB 540 from the third set of SSBs 535. Otherwise, if the quantity of SSBs included in the second set of SSBs 525 does not satisfy the threshold, then the UE 120 may not form the third set of SSBs 535, and may select the second SSB 540 from the second set of SSBs 525. In this way, the UE 120 may ensure that sufficient SSBs are available as candidates for selection for the second subscription, thereby increasing the likelihood of selecting an SSB with sufficient signal strength to receive paging messages.

Figure 6:
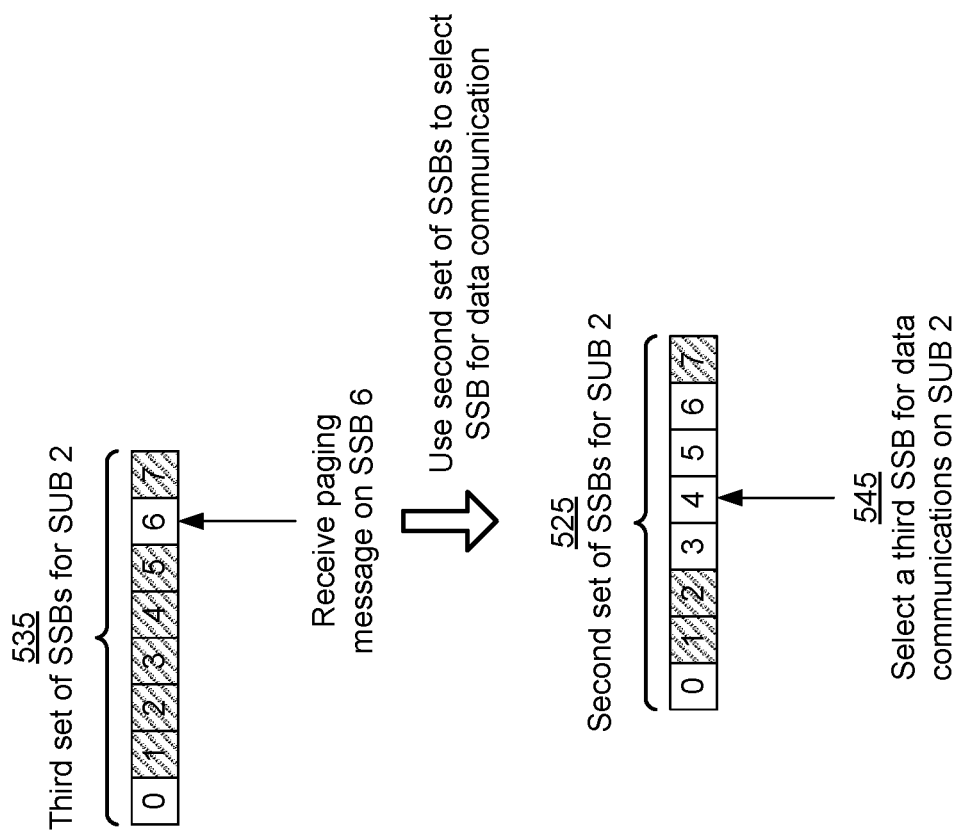
FIG. 6 is a diagram illustrating an example of page collision avoidance for a single receiver multiple SIM UE in accordance with various aspects of the present disclosure.

FIG. 6 is a diagram illustrating an example of page collision avoidance for single receiver multiple SIM UE in accordance with various aspects of the present disclosure. FIG. 6 continues the example of FIG. 5, where the UE 120 selects SSB 6, as the second SSB 540, from the third set of SSBs 535 for page monitoring on the second subscription.

As shown in FIG. 6, the UE 120 may receive a paging message on SSB 6 (or a PDCCH occasion corresponding to SSB 6) based at least in part on monitoring SSB 6. The UE 120 may then use the second set of SSBs 525 to select a third SSB 545 for data communications associated with the paging message. For example, the UE 120 may select the third SSB 545 by measuring all or a subset of the second set of SSBs 525 and selecting the best SSB from the measured SSBs of the second set of SSBs 525 (for example, the SSB with the best measurement(s) or best signal parameter). In some aspects, the UE 120 may select the third SSB 545 by performing a transmit beam switch procedure, which may be performed as part of a random access channel (RACH) procedure or as part of physical downlink shared channel (PDSCH) scheduling, among other examples. The UE 120 may use the third SSB 545 (such as a beam corresponding to the third SSB 545) for data communications associated with the paging message on the second subscription, such as to receive downlink data that triggered transmission of the paging message. In the example of FIG. 6, the UE 120 selects SSB 4 for data communications of the second subscription. This is the same as the first SSB 530 selected by the UE 120 for the first subscription, and represents the best SSB from the set of 8 transmitted SSBs.

Thus, the UE 120 may use the second SSB 540, selected from the third set of SSBs 535, to monitor for paging messages on the second subscription when the UE 120 is in an idle mode (such as an RRC idle mode) or an inactive mode (such as an RRC inactive mode), and may use the third SSB 545, selected from the second set of SSBs 525, for data communications of the second subscription when the UE 120 is in a connected mode (such as an RRC connected mode). In this way, although the UE 120 may select a sub-optimal SSB (out of all transmitted SSBs) to receive a paging message on the second subscription (for example, as long as the sub-optimal SSB satisfies a signal strength parameter), the UE 120 may select an optimal SSB for data communications associated with the paging message, thereby improving data throughput and reducing latency (such as by using a higher bit rate modulation and coding scheme (MCS) for data communications), among other examples.

FIG. 7 is a flowchart illustrating an example process performed, for example, by a UE in accordance with various aspects of the present disclosure. The example process is an example where a UE (for example, UE 120) performs operations relating to page collision avoidance.

As shown in FIG. 7, in some aspects, the process may include determining a first set of SSBs for a first subscription of the UE and a second set of SSBs for a second subscription of the UE (block 710). For example, the UE (for example, using receive processor 258, controller/processor 280, or memory 282, among other examples) may determine a first set of SSBs for a first subscription of the UE and a second set of SSBs for a second subscription of the UE, as described above.

As further shown in FIG. 7, in some aspects, the process may include selecting a first SSB, from the first set of SSBs, for communications of the first subscription (block 720). For example, the UE (for example, using receive processor 258, controller/processor 280, or memory 282, among other examples) may select a first SSB, from the first set of SSBs, for communications of the first subscription, as described above.

As further shown in FIG. 7, in some aspects, the process may include identifying a third set of SSBs by modifying the second set of SSBs to remove one or more SSBs from the second set of SSBs, at least one SSB of the one or more SSBs overlapping in time with the first SSB (block 730). For example, the UE (for example, using receive processor 258, controller/processor 280, or memory 282, among other examples) may identify a third set of SSBs by modifying the second set of SSBs to remove one or more SSBs from the second set of SSBs, at least one SSB of the one or more SSBs overlapping in time with the first SSB, as described above.

As further shown in FIG. 7, in some aspects, the process may include selecting a second SSB from the third set of SSBs (block 740). For example, the UE (for example, using receive processor 258, controller/processor 280, or memory 282, among other examples) may select a second SSB from the third set of SSBs, as described above.

As further shown in FIG. 7, in some aspects, the process may include monitoring the second SSB for paging messages of the second subscription (block 750). For example, the UE (for example, using receive processor 258, controller/processor 280, or memory 282, among other examples) may monitor the second SSB for paging messages of the second subscription, as described above.

The process may include additional aspects, such as any single aspect or any combination of aspects described below or in connection with one or more other processes described elsewhere herein.

In a first aspect, the one or more SSBs include an SSB that overlaps in time with the first SSB and one or more additional SSBs that have an index adjacent to an index of the SSB that overlaps in time with the first SSB.

In a second aspect, alone or in combination with the first aspect, the process includes determining that at least one SSB of the third set of SSBs is associated with a signal strength parameter that satisfies a threshold; and selecting the second SSB from the third set of SSBs based at least in part on determining that at least one SSB of the third set of SSBs is associated with the signal strength parameter that satisfies the threshold.

In a third aspect, alone or in combination with one or more of the first and second aspects, the process includes determining that no SSBs in the third set of SSBs are associated with a signal strength parameter that satisfies a threshold; and selecting the second SSB from the second set of SSBs based at least in part on determining that no SSBs in the third set of SSBs are associated with the signal strength parameter that satisfies the threshold.

In a fourth aspect, alone or in combination with one or more of the first through third aspects, the process includes receiving a paging message based at least in part on monitoring the second SSB for paging messages of the second subscription; selecting a third SSB, from the second set of SSBs, for receiving data communications associated with the paging message; and using the third SSB for receiving the data communications of the second subscription.

In a fifth aspect, alone or in combination with one or more of the first through fourth aspects, the third SSB is selected as part of a random access channel procedure or a physical downlink shared channel scheduling procedure.

In a sixth aspect, alone or in combination with one or more of the first through fifth aspects, the second SSB is used to monitor for paging messages of the second subscription in an idle mode or an inactive mode of the UE, and the third SSB is used for data communications of the second subscription in a connected mode of the UE.

In a seventh aspect, alone or in combination with one or more of the first through sixth aspects, the process includes identifying the third set of SSBs based at least in part on a determination that a quantity of SSBs, included in the second set of SSBs, satisfies a threshold.

In an eighth aspect, alone or in combination with one or more of the first through seventh aspects, the process includes determining that a quantity of SSBs, included in the second set of SSBs, does not satisfy a threshold; and selecting the second SSB from the second set of SSBs based at least in part on determining that the quantity of SSBs, included in the second set of SSBs, does not satisfy the threshold.

In a ninth aspect, alone or in combination with one or more of the first through eighth aspects, the first subscription is associated with at least one of a high priority service or a voice service, and the second subscription is associated with at least one of a low priority service or a data-only service.

In a tenth aspect, alone or in combination with one or more of the first through ninth aspects, the UE is operating in an SR-DSDS mode or a single receiver multiple subscriber identity module multiple standby mode.

Although FIG. 7 shows example blocks of the process, in some aspects, the process may include additional blocks, fewer blocks, different blocks, or differently arranged blocks than those depicted in FIG. 7. Additionally or alternatively, two or more of the blocks of the process may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining a first set of synchronization signal blocks (SSBs) for a first subscription of the UE and a second set of SSBs for a second subscription of the UE;
   selecting a first SSB, from the first set of SSBs, for communications of the first subscription;
   identifying a third set of SSBs by modifying the second set of SSBs to remove one or more SSBs from the second set of SSBs, at least one SSB of the one or more SSBs overlapping in time with the first SSB;
   selecting a second SSB from the third set of SSBs; and
   monitoring the second SSB for paging messages of the second subscription.

2. The method of claim 1, wherein the one or more SSBs include an SSB that overlaps in time with the first SSB and one or more additional SSBs that have an index adjacent to an index of the SSB that overlaps in time with the first SSB.

3. The method of claim 1, further comprising:
   determining that at least one SSB of the third set of SSBs is associated with a signal strength parameter that satisfies a threshold; and
   selecting the second SSB from the third set of SSBs based at least in part on determining that at least one SSB of the third set of SSBs is associated with the signal strength parameter that satisfies the threshold.

4. The method of claim 1, further comprising:
   receiving a paging message based at least in part on monitoring the second SSB for paging messages of the second subscription;
   selecting a third SSB, from the second set of SSBs, for receiving data communications associated with the paging message; and
   using the third SSB for receiving the data communications of the second subscription.

5. The method of claim 4, wherein the third SSB is selected as part of a random access channel procedure or a physical downlink shared channel scheduling procedure.

6. The method of claim 5, wherein the second SSB is used to monitor for paging messages of the second subscription in an idle mode or an inactive mode of the UE and the third SSB is used for data communications of the second subscription in a connected mode of the UE.

7. The method of claim 1, further comprising identifying the third set of SSBs based at least in part on a determination that a quantity of SSBs, included in the second set of SSBs, satisfies a threshold.

8. The method of claim 1, wherein the first subscription is associated with at least one of a high priority service or a voice service, and wherein the second subscription is associated with at least one of a low priority service or a data-only service.

9. The method of claim 1, wherein the UE is operating in a single receiver dual subscriber identity module dual standby (SR-DSDS) mode or a single receiver multiple subscriber identity module multiple standby mode.

10. A user equipment (UE) for wireless communication, comprising:
    a memory; and
    one or more processors operatively coupled to the memory, the memory and the one or more processors configured to:
       determine a first set of synchronization signal blocks (SSBs) for a first subscription of the UE and a second set of SSBs for a second subscription of the UE;
       select a first SSB, from the first set of SSBs, for communications of the first subscription;
       identify a third set of SSBs by modifying the second set of SSBs to remove one or more SSBs from the second set of SSBs, at least one SSB of the one or more SSBs overlapping in time with the first SSB;
       select a second SSB from the third set of SSBs; and
       monitor the second SSB for paging messages of the second subscription.

11. The UE of claim 10, wherein the one or more SSBs include an SSB that overlaps in time with the first SSB and one or more additional SSBs that have an index adjacent to an index of the SSB that overlaps in time with the first SSB.

12. The UE of claim 10, wherein the one or more processors are further configured to:
    determine that at least one SSB of the third set of SSBs is associated with a signal strength parameter that satisfies a threshold; and
    select the second SSB from the third set of SSBs based at least in part on determining that at least one SSB of the third set of SSBs is associated with the signal strength parameter that satisfies the threshold.

13. The UE of claim 10, wherein the one or more processors are further configured to:
    receive a paging message based at least in part on monitoring the second SSB for paging messages of the second subscription;
    select a third SSB, from the second set of SSBs, for receiving data communications associated with the paging message; and
    use the third SSB for receiving the data communications of the second subscription.

14. The UE of claim 13, wherein the third SSB is selected as part of a random access channel procedure or a physical downlink shared channel scheduling procedure.

15. The UE of claim 13, wherein the second SSB is used to monitor for paging messages of the second subscription in an idle mode or an inactive mode of the UE and the third SSB is used for data communications of the second subscription in a connected mode of the UE.

16. The UE of claim 10, wherein the one or more processors are further configured to identify the third set of SSBs based at least in part on a determination that a quantity of SSBs, included in the second set of SSBs, satisfies a threshold.

17. The UE of claim 10, wherein the first subscription is associated with at least one of a high priority service or a voice service, and wherein the second subscription is associated with at least one of a low priority service or a data-only service.

18. The UE of claim 10, wherein the UE is operating in a single receiver dual subscriber identity module dual standby (SR-DSDS) mode or a single receiver multiple subscriber identity module multiple standby mode.

19. A non-transitory computer-readable medium storing one or more instructions for wireless communication, the one or more instructions comprising:

one or more instructions that, when executed by one or more processors of a user equipment (UE), cause the one or more processors to:
  determine a first set of synchronization signal blocks (SSBs) for a first subscription of the UE and a second set of SSBs for a second subscription of the UE;
  select a first SSB, from the first set of SSBs, for communications of the first subscription;
  identify a third set of SSBs by modifying the second set of SSBs to remove one or more SSBs from the second set of SSBs, at least one SSB of the one or more SSBs overlapping in time with the first SSB;
  select a second SSB from the third set of SSBs; and
  monitor the second SSB for paging messages of the second subscription.

20. The non-transitory computer-readable medium of claim 19, wherein the one or more SSBs include an SSB that overlaps in time with the first SSB and one or more additional SSBs that have an index adjacent to an index of the SSB that overlaps in time with the first SSB.

21. The non-transitory computer-readable medium of claim 19, wherein the one or more instructions, when executed by the one or more processors, further cause the one or more processors to:
  determine that at least one SSB of the third set of SSBs is associated with a signal strength parameter that satisfies a threshold; and
  select the second SSB from the third set of SSBs based at least in part on determining that at least one SSB of the third set of SSBs is associated with the signal strength parameter that satisfies the threshold.

22. The non-transitory computer-readable medium of claim 19, wherein the one or more instructions, when executed by the one or more processors, further cause the one or more processors to:
  receive a paging message based at least in part on monitoring the second SSB for paging messages of the second subscription;
  select a third SSB, from the second set of SSBs, for receiving data communications associated with the paging message; and
  use the third SSB for receiving the data communications of the second subscription.

23. The non-transitory computer-readable medium of claim 19, wherein the one or more instructions further cause the one or more processors to identify the third set of SSBs based at least in part on a determination that a quantity of SSBs, included in the second set of SSBs, satisfies a threshold.

24. The non-transitory computer-readable medium of claim 19, wherein the UE is operating in a single receiver dual subscriber identity module dual standby (SR-DSDS) mode or a single receiver multiple subscriber identity module multiple standby mode.

25. An apparatus for wireless communication, comprising:
  means for determining a first set of synchronization signal blocks (SSBs) for a first subscription of the apparatus and a second set of SSBs for a second subscription of the apparatus;
  means for selecting a first SSB, from the first set of SSBs, for communications of the first subscription;
  means for identifying a third set of SSBs by modifying the second set of SSBs to remove one or more SSBs from the second set of SSBs, at least one SSB of the one or more SSBs overlapping in time with the first SSB;
  means for selecting a second SSB from the third set of SSBs; and
  means for monitoring the second SSB for paging messages of the second subscription.

26. The apparatus of claim 25, wherein the one or more SSBs include an SSB that overlaps in time with the first SSB and one or more additional SSBs that have an index adjacent to an index of the SSB that overlaps in time with the first SSB.

27. The apparatus of claim 25, further comprising:
  means for determining that at least one SSB of the third set of SSBs is associated with a signal strength parameter that satisfies a threshold; and
  means for selecting the second SSB from the third set of SSBs based at least in part on determining that at least one SSB of the third set of SSBs is associated with the signal strength parameter that satisfies the threshold.

28. The apparatus of claim 25, further comprising:
  means for receiving a paging message based at least in part on monitoring the second SSB for paging messages of the second subscription;
  means for selecting a third SSB, from the second set of SSBs, for receiving data communications associated with the paging message; and
  means for using the third SSB for receiving the data communications of the second subscription.

29. The apparatus of claim 25, further comprising means for identifying the third set of SSBs based at least in part on a determination that a quantity of SSBs, included in the second set of SSBs, satisfies a threshold.

30. The apparatus of claim 25, wherein the first subscription is associated with at least one of a high priority service or a voice service, and wherein the second subscription is associated with at least one of a low priority service or a data-only service.

* * * * *